United States Patent [19]

McMillen

[11] Patent Number: 4,626,723
[45] Date of Patent: Dec. 2, 1986

[54] ACTUATOR SYSTEM FOR AUTOMOTIVE SEAT MOVER MECHANISMS AND THE LIKE

[75] Inventor: Bobby E. McMillen, Columbus, Miss.

[73] Assignee: AMBAC Industries, Incorporated, Columbus, Miss.

[21] Appl. No.: 358,390

[22] Filed: Mar. 15, 1982

[51] Int. Cl.⁴ .......................................... H02K 23/00
[52] U.S. Cl. .................................... 310/83; 310/112; 310/114
[58] Field of Search ................ 310/112, 114, 83, 126, 310/124

[56] References Cited

U.S. PATENT DOCUMENTS

| | | | |
|---|---|---|---|
| 3,463,954 | 7/1969 | Latta . | |
| 3,465,185 | 9/1969 | Rollig | 310/112 |
| 3,471,729 | 10/1969 | Latta et al. . | |
| 3,510,707 | 5/1970 | Stone et al. . | |
| 3,723,796 | 3/1973 | Mason | 310/126 |
| 3,757,149 | 9/1973 | Holper | 310/83 X |
| 4,221,984 | 9/1980 | Mason | 310/114 X |
| 4,296,343 | 10/1981 | McMillen . | |

Primary Examiner—Donovan F. Duggan
Attorney, Agent, or Firm—Dann, Dorfman, Herrell and Skillman

[57] ABSTRACT

A plurality of motors are arranged in a side-by-side array employing at least one common end cap or closure for the housings of the individual motors which are formed as to securely interfit with the respective housings and provide a base or reference frame member relative to which they are all supported. There may be a common end plate of this type at both ends of the array. The end plate also serves to provide bearing support for the shafts of the armatures and to provide support for gear coupling to a torque/speed conversion coupling member. Preferably, the end cap also provides support and a closure for gear means employed as well.

The motors employed are advantageously of a type having flat generally parallel sides the dimension across whose sides is significantly smaller than the diameter of the housing containing the magnetic pole pieces. Such a configuration permits increased compactness if the flat sides are placed face to face in the array. Alternatively, it provides substantially greater thinness to the array packet if the flat sides are arranged in parallel coplanar configuration enabling use of higher powered motors in confined space such as under automobile seats.

7 Claims, 6 Drawing Figures

ACTUATOR SYSTEM FOR AUTOMOTIVE SEAT MOVER MECHANISMS AND THE LIKE

BACKGROUND OF THE INVENTION

1. Field of the Invention

This invention relates generally to electric motors and, more particularly, to a means of housing a plurality of armatures having similar electrical and magnetic characteristics within a common compact housing structure and means to deliver preselected speed/torque values that may vary from one armature to another.

2. Description of Prior Art

In the past, there have been electric motor packages produced that contain a plurality of armatures within a common housing structure. Devices of this type are shown in U.S. Pat. Nos. 3,463,954, 3,471,729 and 3,510,707. Primarily, motors of this type that are packaged together in a plural form are used in power seat drives for automobiles where movement of the seat in a number of directions is provided. Normally, these directions include fore and aft as well as up and down. A plurality of independently controlled motors for such an application offer advantages over a single motor with required clutches, solenoids and other mechanical paraphernalia to provide the various directions of movement to the seat.

There have been some problems connected with use of a plurality of independently controlled motors that are solved by the present invention. Specifically, considerably more torque is required to raise and lower the backside of a seat due to lifting the weight of the seat and the occupant(s) whose weight is normally concentrated primarily at the backside of a seat than, for example, is required for fore and aft movement. Commonly, for automotive seat mover mechanisms, for example, have used a package of three motors. Prior to the present invention, the options in the design of the motor package were first to either design all three motor sections with torque sufficient to provide the lifting power of the seat or construct one motor in the package differently from the other two in order to provide the required torque. The first option is not desirable due to added cost in material such as magnets and wire on those two of the motors which do not need as much power. The second option is not desirable because of added cost in assembly since the corresponding special parts which differ, such as magnets, armatures, etc. add complications and must be handled separately during assembly. Non-common parts also add cost in stocking more motor components as well as in having to purchase the differing components in lower volumes.

THE ADVANCE OF THE PRESENT INVENTION

One advance of the motor assembly in accordance with the present invention takes advantage of making at least one of the end closures the base or common support of a plurality of motors. The housings may have separate end closures on the other end thereof but the housings and separate end closures are snugly interfitting parts when secured to the base or common support. Another advance is that such a base can then be used to support and house necessary gears to facilitate change in speed/torque from any selected motor shaft. In fact, the possibility of a second common support at opposite ends providing such a gear housing on opposite ends of the same shaft allows a choice of two speed/torque ratios from a single shaft.

Using a motor shape having flat parallel sides offers additional advantages. By making a motor housing with sides between poles flattened, for example, as taught in U.S. Pat. No. 4,296,343, having a common inventor and assignee with the present invention, it is possible to make the space between the sides of a significantly smaller dimension. When such motors are aligned in side by side arrays, the possibility exists to alter the dimensions in two directions by rotating each of the flatsided motor housings 90°. The space saving in one dimension may be cumulative when the flat faces are placed side by side. On the other hand, when available installation space is limited, as for example, under the seat of an automobile, reducing the thickness of the array to the dimensions between the parallel sides without reducing power can have important advantages.

A further advantage over prior art of the assembly in accordance with the present invention is to be found in the fact that when motor housings are used that are constructed in accordance with U.S. Pat. No. 4,296,343, a smaller overall assembly may be constructed to deliver power equal to one of the types of much larger size.

Other unique features of the present invention will be apparent from the following description.

SUMMARY OF THE INVENTION

In accordance with the present invention, a plurality of motor housings or the equivalent thereof are secured together by at least one common integral end cap. Gearing means supported by the end cap are provided to alter speed, torque or direction of rotation of the output shaft on at least one end of one motor. Such gearing means, according to the present invention, may be housed in at least one of the two end caps of the housing of the geared motor. Further, by providing housings separate for each motor, each provided with at least two flat parallel sides, the housings may be joined to alternative forms of end caps with the flat sides together or alternately with the flat sides lying in common parallel planes, to thereby dimensionally change the space required for the installation of the package.

DESCRIPTION OF SPECIFIC EMBODIMENTS

Figure 1:
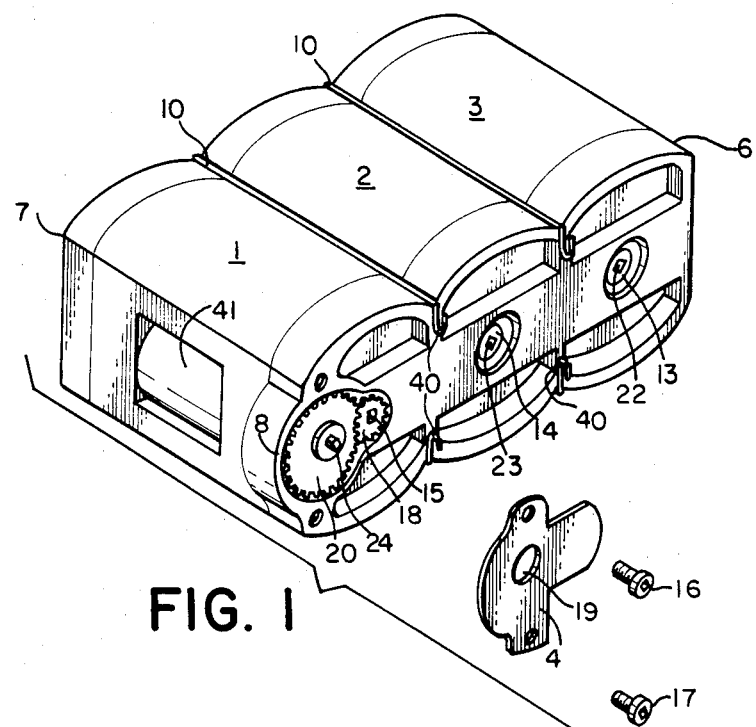
FIG. 1 is a perspective view of a multi-motor package according to the present invention having the motors with their flat housing surfaces opposed to one another and with gear cavity cover removed.
Figure 6:
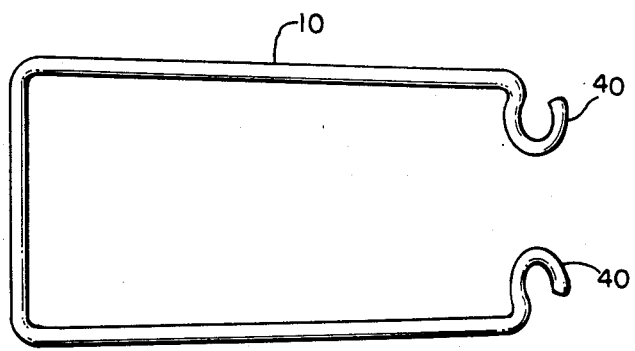
FIG. 6 is a view of a retainer for holding together the motor assembly by holding the end caps to the ends of the motor housings.

Referring to FIG. 1, there is shown three motors having housings 1, 2 and 3, each having two flat parallel sides that are arranged with flat sides face to face opposed to each other. Composite end cap 6 and 7, each formed as a one piece structure, extends across and close the respective ends of all three housings. Shoulders (not shown) formed on the housing side of each end cap conforming to the respective inside dimension of the motor housings to insure snug interfitting of parts may be used to precisely position the motor housings with respect to the end caps and one another. Alternative positioning means are acceptable such as, for example, a groove or recess formed in each end cap that conforms to the shape and size of the motor housing and snugly interfits therewith. The end caps may be secured to the housing by a variety of means; for example, spring retainers 10 provide a convenient means for holding the end caps in position. Such a spring retainer is shown in FIG. 6. Alternatively, various other retaining devices may be used, including bolts that extend across or through the motor housing from one end cap to the other.

Located in each housing 1, 2 and 3 is an armature that is journaled to rotate therein. The ends of the armature shafts 13 and 14 are accessible for connecting drive cables and the like. Armature shaft 15 has a gear 18 secured thereto that meshes with a larger gear 20. Suitable coupling means is provided on the larger gear for connecting another drive cable. For applications such as seat movers, conventional drive cables are used, the ends of which are usually square and fit down into a square coaxial coupling recess of a driving member. Armature shafts 13 and 14 are provided with such a coupling recess 22 and 23, respectively. Similarly, a coaxial recess area 24 is provided in gear 20 to receive a third drive cable. One possible alternative coupling means is comprised of an extended portion of shafts 13 and 14 that are formed in a manner to provide a hollow cylindrical sleeve wherein holes are aligned radially in opposite walls of the sleeve. A drive cable having a suitable round mating end for insertion into the sleeve would be provided with a radially located hole that extends through the mating end to receive a roll pin that extends through the sleeve and end portion of the cable thereby fastening the cable and sleeve together. This same fastening arrangement would also be suitable for coupling a drive cable to gear 20. In this instance the gear would be formed to provide a cylindrical sleeve extending therefrom for securing a suitable round mating end of a drive cable and the two members would thereby be pinned together with a roll pin as previously described. Gears 18 and 20 are housed in a cavity 8 provided in the end cap 6 so that, with cover 4 in place and secured to the end cap by screws 16 and 17, the gears are enclosed to retain lubricants and prevent entry of dirt. Opening 19 provides access for the drive cable to be connected to gear 20.

The components such as the armature, the fields, brushes and brush rigging in each motor may be identical, yet the final output delivered to the drive cable may be altered in any one or more of the motors and at either or both end caps by means of a gear train as illustrated. From the illustration shown, assuming identical motors, the torque provided to a drive cable connected to gear 24 would be more than the torque provided by armature shafts 13 and 14. Just as the torque is increased, the speed is decreased with the arrangement shown. It is, of course, obvious that by changing the size ratio between gears 18 and 20, the speed and torque may be altered as required and yet be able to keep the construction of all three motors identical to each other.

Figure 2:
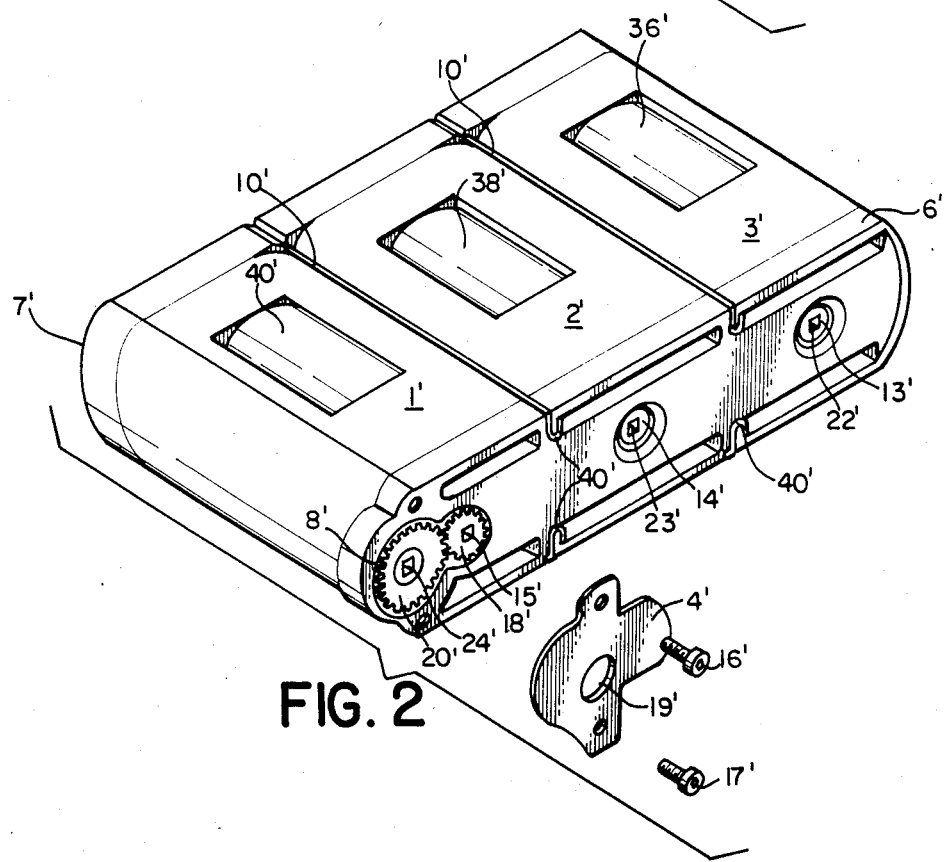
FIG. 2 is a perspective view of a similar multi-motor package according to the present invention having the motors aligned but rotated 90° so that their flat sides lie in common parallel planes.

Reference is now made to FIG. 2 where like numerals with the addition of primes thereto are used to identify parts corresponding to those of FIG. 1, and wherein the application flexibility according to this invention is further illustrated. In this arrangement the flattened sides of the motors are placed in coplanar relationship with each other. It is obvious that while the width of the overall assembly is increased over the assembly of FIG. 1, the height is greatly reduced. The assembly in accordance with FIG. 2, therefore, would, for example, require less vertical space for installation in an under seat application. In the new and smaller automobiles, the space between the seat bottom and floor has been reduced so that the thinner assembly of FIG. 2 is very attractive for this and similar applications. As in FIG. 1, FIG. 2 has provision for drive cable connections including a speed/torque alteration means for one of the motors. The end caps are positioned and retained in the same manner as discussed for FIG. 1.

It is anticipated that the speed/torque alteration means may be provided at either or both ends of any or all motors that make up the assembly. Furthermore, while the assemblies shown and discussed herein consist of three motors, the concept encompasses any plurality of motors.

Figure 3:
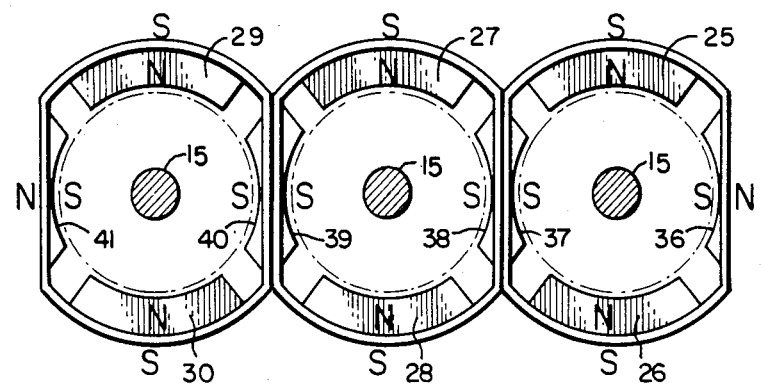
FIG. 3 is an end view of the housing of a multi-motor package of FIG. 1 having the front end cap removed.
Figure 4:
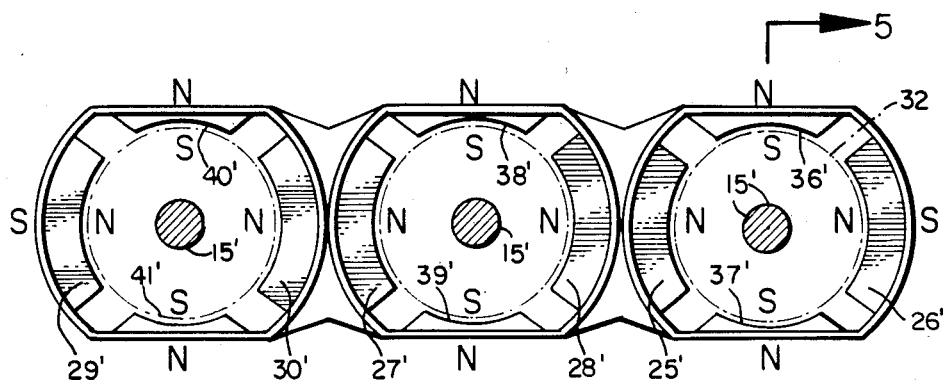
FIG. 4 is an end view of the housing of a multi-motor package of FIG. 2 having the front end cap removed.

To further enhance the novel design of providing a very compact yet powerful assembly, each motor housing formed in a manner so as to provide a four pole field structure while utilizing only two permanent magnet fields in each motor housing. This is accomplished by means as best illustrated in FIG. 3 and FIG. 4 that correspond to the motor housing arrangements as shown in FIGS. 1 and 2, respectively. Permanent magnet field pieces 25, 26, 27, 28, 29 and 30 in FIG. 3 (and corresponding to primed numbers in FIG. 4), preferably made of a ceramic material, are each secured by an adhesive or other holding means to those opposed portions of the motor housing of cylindrical form. The two opposing flat sides of each motor are deformed to provide inwardly projecting intermediate pole surfaces 36, 37, 38, 39, 40 and 41 as taught in U.S. Pat. No. 4,296,343. These intermediate poles are magnetized by an induction effect generated from the adjacent permanent magnets so that poles of opposite polarity are produced adjacent each other. For example, in FIG. 3, each of the three motor housings, starting from a twelve o'clock position and moving in a clockwise direction, has adjacent the armature a polarity of North, South, North and South thus providing four poles for each housing. In FIG. 4, each motor housing has been rotated approximately ninety degrees from their position in FIG. 3; but, otherwise, the relationship of the poles remains the same. The incorporation of the intermediate induced poles by deformation of the motor housing enables use of smaller magnets and thinner motor housings in the assembly. The overall length of the motor housing can also be reduced, all of which are prime concerns where space and weight are to be minimized.

Figure 5:
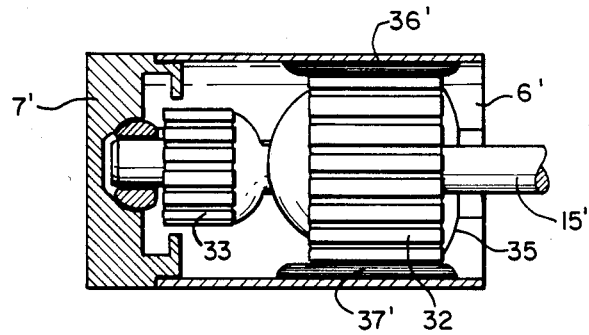
FIG. 5 is a longitudinal cross-sectional view taken along line 4—4 of FIG. 4 but showing the armature in elevation.

The internal construction of a typical motor housing according to this invention is shown in FIG. 5 wherein a sectional view is taken through one of the motor housings of FIG. 4 with the armature in elevation. The arrangement of armature shaft 15 having a stack of laminations 32 and a commutator 33 secured thereto is conventional. Windings 35 are placed in the lamination stack and secured to the commutator. Brushes are not shown; however, they are positioned so as to rest against the commutator in a conventional manner. The armature is journaled in bearings supported in the end caps so as to be rotatable within the motor housing.

It may be possible by omitting the induced poles of the four pole construction to remove the housing walls between armatures and effectively use a single housing for three (or any plurality) of two pole motors.

FIG. 6 is a plan view of a retainer that may be used to hold the end caps against the motor housing. Preferably, a spring wire material is formed to provide a generally "U" shaped clamping structure having hooks 40 on each end. These hooks are formed to have inwardly extending shoulder portions which engage the outside wall of an end cap. The hooks preferably fit into grooves in end caps 6 and 7 and are formed so that they aid in spreading apart the clamping structure and pulling it into place. The clamping structure is designed to snugly engage the assembly and so as to snap into a position when positioned around the motors over the end caps as shown. It is anticipated that various other configurations of retainers could be used as well as various other holding devices. For example, bolts that extend from one end cap to the other may be used without departing from the basic concept of the invention.

Two modifications of the present invention have been illustrated and described and useful changes therein have been suggested. Many more variations and modifications within the concept of the present invention will occur to those skilled in the art. All such variations and modifications within the scope of the claims are intended to be within the scope and spirit of the present invention.

I claim:
1. An electric motor assembly comprising:
   a plurality of similar armatures, each of which is supported on a shaft for rotation;
   a separate housing, providing a field for each armature so that the housings and armatures constitute separate individual motors each without at least one end closure;
   a common one piece end cap for at least one end of each housing to which an open end of each motor housing is affixed, which supports each motor housing relative to each other in a side by side relationship and which provides bearings for each armature shaft;
   a first coupling means on at least one end of a first armature shaft to receive and drive a first external member; and
   a second coupling means rotatably supported on said common housing closure means which second coupling means is driven by gears intermediate to a second armature shaft including a gear on the shaft, which gears provide an altered speed/torque output from that provided to the first coupling means, which second coupling means has provisions to receive and drive a second external member.

2. An electric motor assembly as recited in claim 1 wherein the gears intermediate to and driven by an armature shaft are housed within a recess in an end cap of the assembly.

3. An electric motor assembly as recited in claim 1 wherein an end cap fabricated to provide a second common base for each motor housing is secured at the other end of the housing to more securely hold the plurality of housings together.

4. An electric motor assembly as recited in claim 3 wherein the end caps that position each end of the motor housings are secured thereto by a "U" shaped spring member with inward extending shoulders at its open end which spring extends around the assembly only embracing one end cap and the edges of the other end cap and when in place resiliently engaging the structure so that its shoulders engage the other end cap for retaining the two end caps in place on the ends of the motor housings.

5. An electric motor assembly comprising:
   a plurality of armatures including supporting shafts, one end of at least one of the shafts providing a first connecting means adapted to receive and drive a first external member and a second corresponding shaft end having a coaxial gear secured thereto;
   a separate housing structure for each armature wherein said structures are of tubular ferrous material having at least two magnetic field pole pieces secured therein and at least two intermediate induced field pole pieces provided by inwardly projecting sections of sidewalls of the tubular ferrous material but open at each end; and
   end caps for the housings including at least one common one piece end cap for each housing fabricated so as to provide a common base closely fitted to each housing that positions and holds the plurality of housings in a side-by-side relationship and that houses within a recess a second connecting means rotatably supported by the at least one end cap and including a gear meshing with the gear on the second armature shaft to provide an altered speed/torque output from that of the first connecting means and adapted to receive and drive a second external member.

6. An electrical motor assembly as recited in claim 5 wherein there is provided at each end of the electric machine assembly an end cap fabricated so as to be a common base that positions and holds the plurality of housings in a side-by-side relationship.

7. An electric motor assembly as recited in claim 6 wherein the end caps that position each end of the motor housings are secured thereto by a "U" shaped spring member with inward extending shoulders at its open end which spring extends around the assembly only embracing one end cap and the edges of the other end cap and when in place resiliently engaging the structure so that its shoulders engage the other end cap for retaining the two end caps in place on the ends of the motor housings.

* * * * *